BEST AVAILABLE COPY
May 1, 1928. S. W. JAMES Re. 16,950
SERVICE PLATTER.
Original Filed Aug. 27, 1927
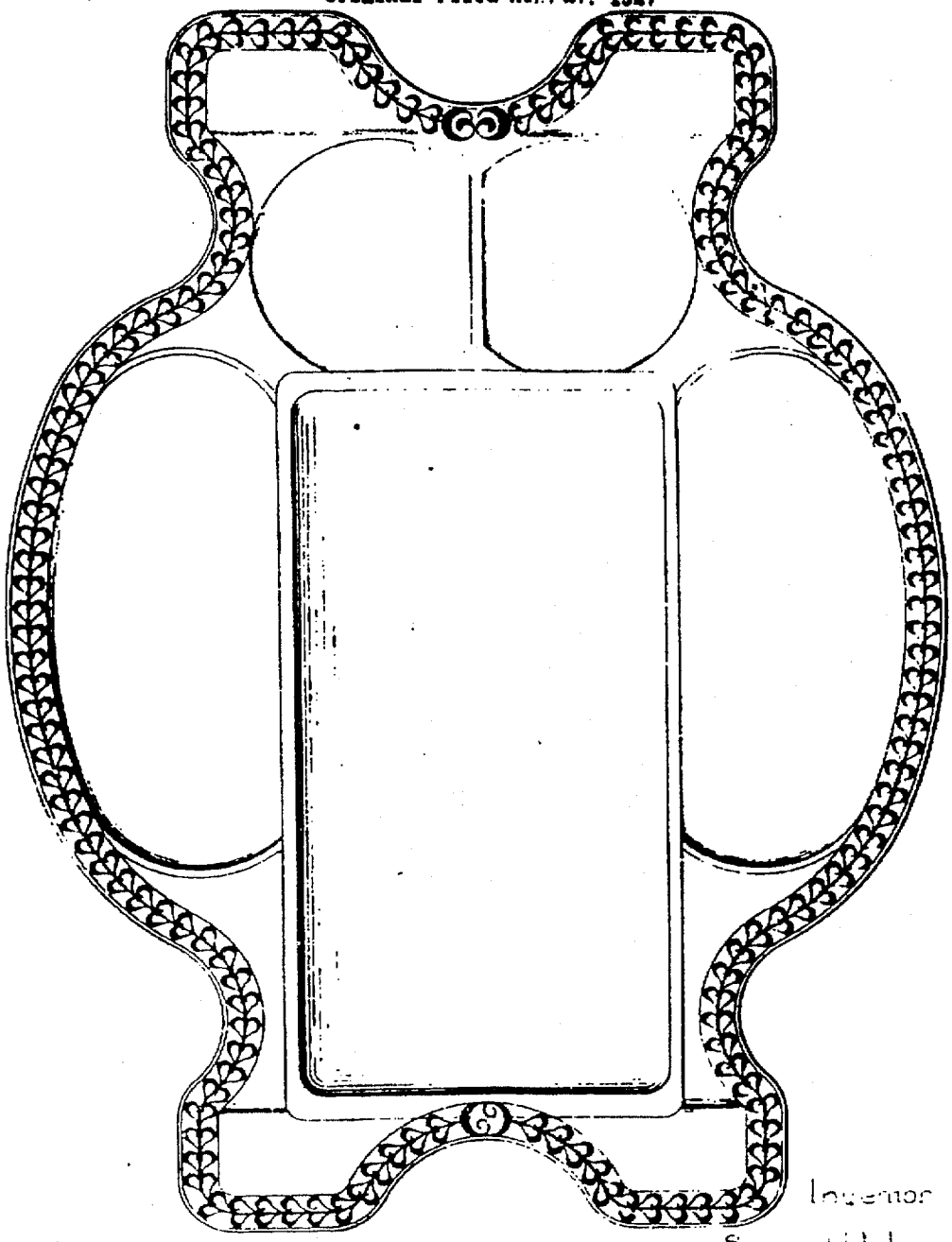
Inventor
Samuel W. James
By Joshua R. H. Fottler
his Attorney
Witnesses
S. J. Collins
F. C. Appleton

BEST AVAILABLE COPY

Reissued May 1, 1928.

Re. 16,950

UNITED STATES PATENT OFFICE.

SAMUEL W. JAMES, OF CHICAGO, ILLINOIS, ASSIGNOR TO BETTER TABLE SERVICE, INC., OF CHICAGO, ILLINOIS, A CORPORATION OF ILLINOIS.

DESIGN FOR A SERVICE PLATTER.

Original No. 73,744, dated November 1, 1927. Serial No. 23,222, filed August 27, 1927, for 3½ years.
Application for reissue filed December 17, 1927. Serial No. 24,521. Term of patent 14 years.

*To all whom it may concern:*

Be it known that I, SAMUEL W. JAMES, a citizen of the United States, residing at Chicago, in the county of Cook and State of Illinois, have invented a new, original, and ornamental Design for a Service Platter, of which the following is a specification, reference being had to the accompanying drawing, forming a part thereof.

The figure is a plan view of a service platter, embodying my design.

I claim:

The ornamental design for a service platter, as shown.

In testimony whereof I have signed my name to this specification.

SAMUEL W. JAMES.